Patented Nov. 7, 1922.

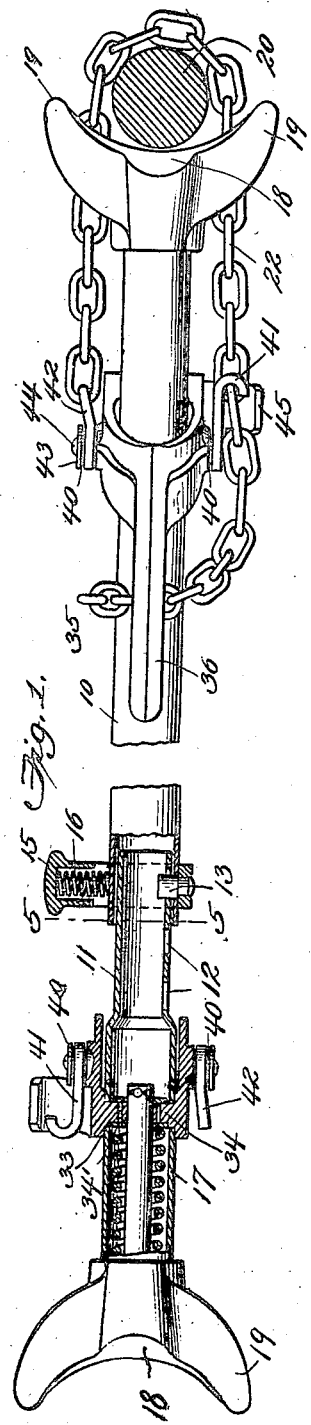

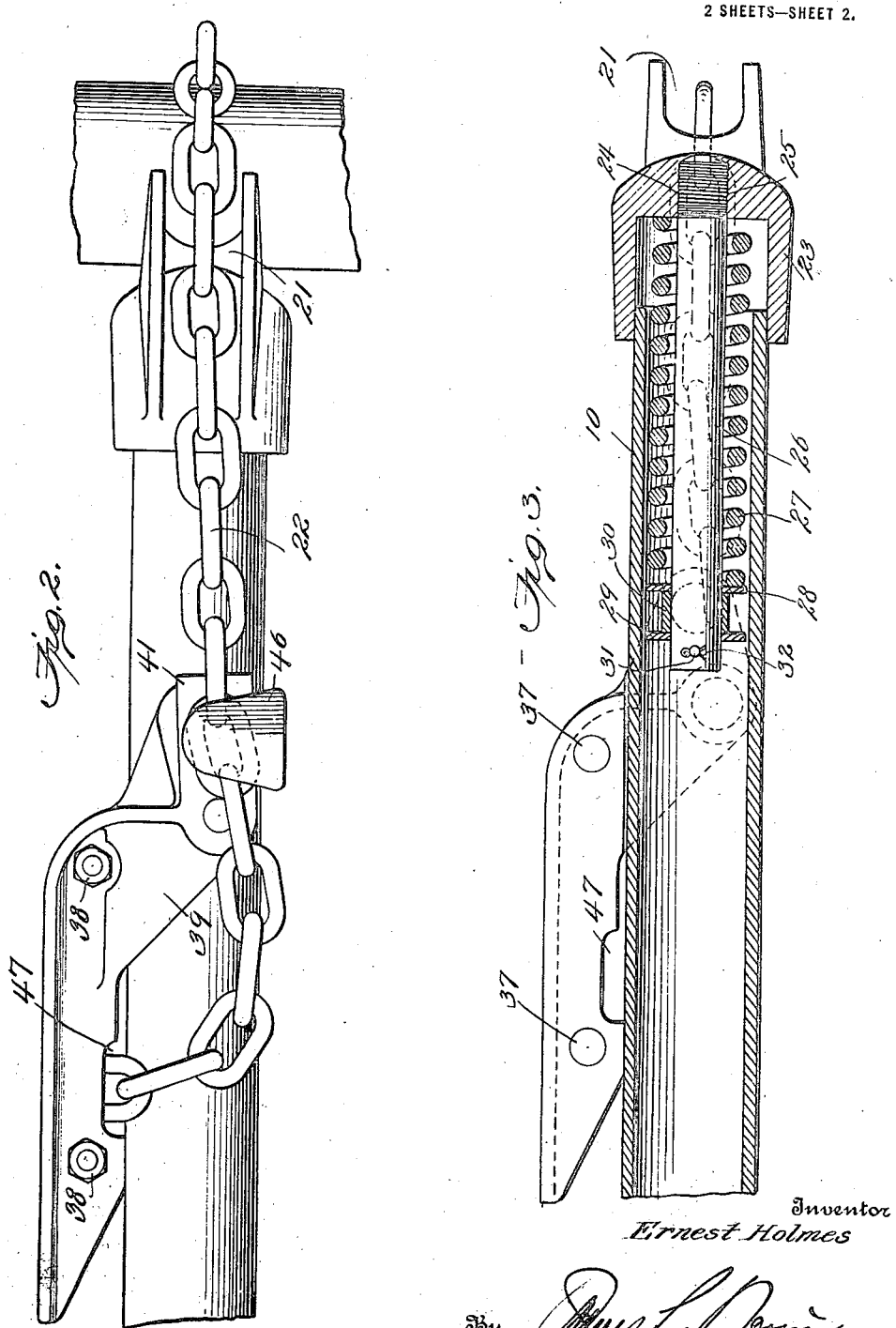

1,435,064

UNITED STATES PATENT OFFICE.

ERNEST HOLMES, OF CHATTANOOGA, TENNESSEE, ASSIGNOR TO ERNEST HOLMES COMPANY, OF CHATTANOOGA, TENNESSEE, A CORPORATION OF TENNESSEE.

TOWING DEVICE.

Application filed January 17, 1921. Serial No. 437,942.

*To all whom it may concern:*

Be it known that I, ERNEST HOLMES, a citizen of the United States, residing at Chattanooga, in the county of Hamilton and State of Tennessee, have invented new and useful Improvements in Towing Devices, of which the following is a specification.

This invention relates to improvements in towing devices and is especially intended for towing a disabled motor vehicle by means of a relief motor vehicle, in such a manner that no undue strains or shocks will come upon the axles of the vehicles nor on the driving mechanism or other parts thereof.

My invention aims to provide a towing device the parts of which may be easily and economically manufactured and readily assembled.

A further object of the invention is to provide a towing device which may be quickly applied to the two vehicles so as to take up all slack in the coupling means thereby eliminating shocks and undue strains upon the vehicles and upon the towing mechanism.

Another object of my invention is to provide yielding means in the towing device whereby movements tending to compress the towing device are yieldingly resisted without causing any disrupting forces upon the towing device or the vehicles.

My invention also aims to provide a towing device capable of being adjusted in length thereby eliminating the necessity of close maneuvering of the vehicles before the towing device can be attached.

The invention for accomplishing the above and other objects is described more fully in the following description and more particularly pointed out in the claims. The description refers to the accompanying drawing, in which:—

Fig. 1 is a view of a complete device showing the same in side elevation at one end and in vertical section at the other end.

Fig. 2 is a bottom plan view of one end of the towing device showing the same applied to the rear axle of a motor vehicle.

Fig. 3 is a central vertical section of that part of the towing device shown in Fig. 2.

Fig. 4 is a top plan view of a portion of the towing device showing the locking mechanism in released position.

Fig. 5 is a section on line 5—5 of Fig. 1.

Fig. 6 is a side elevation of the locking element detached from the towing device.

The numeral 10 designates a tubular casing which is adapted to telescopically receive at one end a tubular member 11 of smaller diameter. This tubular member 11 is provided with a plurality of spaced apertures 12 adapted to be engaged by a pin 13 carried by a yoke 14 which loosely embraces the outer casing 10 and is adjustable longitudinally thereof. The yoke 14 is provided with a hollow button 15 in which is inserted one end of a coil spring 16 which acts between the casing 10 and the button 15 and tends to normally force and retain the pin 13 in one of the spaced apertures 12 and may be selectively placed in any one of said apertures for the purpose of adjusting the length of the towing device. By this construction the yoke may be moved along the sleeve 10, thereby varying at will the amount of overlap of the tubes 10 and 11 beyond the pin 13. The tubular member 11 is enlarged at 17 so as to be substantially of the same diameter as the tubular casing 10 and this enlarged portion 17 and the opposite end of the tubular casing 10 are adapted to receive towing head assemblies which are hereinafter more fully described.

Each of these towing head assemblies consists of a towing head 18 having two pairs of opposite projecting prongs 19 which are slightly curved so as to partially embrace the rear axle 20 of the relief machine and the front axle of the disabled machine and these prongs 19 are channelled as shown at 21 in Figures 2, 3 and 4, for the purpose of receiving and guiding a chain 22. The towing head is also formed with an annular flange or sleeve 23 and a central recess 24 arranged coaxially with the flange and provided with screw threads adapted to engage the threaded end 25 of a rod 26. A coil spring 27 embraces the rod 26 and is compressed between the towing head and a washer 28 slidably mounted upon the rod. A washer 29 similar to 28 is also slidably mounted on the rod 26 and these washers are maintained in spaced relation by means of a bushing 30 loosely mounted upon the rod. Spring 27 is maintained under compression between the towing head 18 and the washer 28 by means of a pin 31 which passes through an aperture near one end of the rod 26 and is retained in place by cotter pins 32. From this description it is apparent that the towing head assembly may be inserted into one end of the tubular casing 10 and into enlarged portion 17 of the tubular member 11 as a unit.

When the towing head assemblies are in operative position, as shown in Figures 3, the sleeves or flanges 23 are adapted to surround the casing 10 and tubular member 17 with a sliding fit so that in conjunction with the tubular casing 10 and member 17, these annular flanges 23 provide housings for the springs 27.

The casing 10 and the tubular member 11 are each provided near one end with opposite openings 33 for receiving inwardly projecting cam shaped bosses 34 formed on opposite and similar parts 35, 36 of a locking element. These bosses 34 are inserted between the washers 28, 29 of the towing head assembly and each has a flattened portion 34′ which is adapted to extend parallel to the washer 28 when the locking element is closed as in Fig. 3. The two parts 35, 36 of the locking handle are held together by means of bolts passing through the aligning apertures 37 formed in the parts 35, 36 and nuts 38 which engage the threaded ends of said bolts. The locking element is thus pivotally mounted at one end by means of the inwardly projecting lugs 34. These lugs also positively retain the towing head assembly within the tubular casing and tubular member. The handle portions 35, 36 of each locking element are connected to the lugs by means of curved portions 39 which extend over the casing and these curved parts 39 are provided with oppositely extending trunnions 40 on which are swiveled hook shaped members 41, 42. Each member 42 is of simple hook shape for engaging in the loop of a link of the chain while each member 41 is slotted or bifurcated at one end so that a link of the chain may be inserted edge-wise therethrough and the chain maintained in operative engagement by means of the succeeding link which is arranged transversely to the link passing through the slot of the hook. The hooks 41 and 42 are retained upon the trunnions 40 by means of washers 43 and screws 44 which engage threaded apertures formed in said trunnions.

The parts 36 of the locking elements are provided with outwardly projecting guards 45 which extend immediately below the hooks 41 and are provided with upstanding flanges 46 for the purpose of preventing displacement of the locking links from their engagement with the hooks 41.

The chain 22 has one of its links connected to the hook 42 and extends from thence through a channelled prong 19 of the towing head, about the rear axle 20, and through the channel of the opposite prong when it may be drawn taut and one of the links inserted through the bifurcation of the hook 41. When this is done the locking element should be in released position as shown in Figure 4. In order to bind the chain tightly upon the rear axle and to slightly compress the spring 27 the locking element is turned about its pivots 34 until it lies immediately in contact with the casing as shown in Figure 3 which is in locked position. It will be noted that, in this position, the trunnions and the direction of the force exerted by the chain 22 are below the pivots 34 and therefore tensile stresses on the chains tend to lock the locking element more securely. The lower surface of the locking element is provided with a recess 47 through which the free end of the chain may be inserted and thus maintained out of the way and prevented from dragging or making a bothersome noise by striking metallic parts of the towing device. In this locked position the tension of the springs 27 is exerted on the flat surfaces 34′ of the cam lugs 34 through washers 28 and thus tends to keep the locking elements in locked position as the compressive force of the springs increases.

In assembling this mechanism, the towing head assemblies are first inserted through the open ends of the tubular casing and tubular member and the two parts of the locking elements are then placed in position with the lugs or pivots 34 engaging between the washers 28 and 29, when the two parts of the locking element may be secured together by means of the bolts passing through the apertures 37 and the retaining nuts 38. With the towing device thus assembled, for connecting two machines, the towing device should be first adjusted to the proper length according to the distance between the vehicles and the chains 22 then applied around the rear and front axles of the vehicles, respectively, and attached to the hooks 41 and 42 while the locking elements are in released position. Then the locking elements are moved pivotally to closed position and the free ends of the chains inserted through the recess 47. The vehicles are now firmly connected together so as to eliminate all slack in the coupling device and thereby prevent undue strains and shocks coming upon the vehicles due to the towing vehicle suddenly taking up the slack, and further, the compression forces due to the sudden retardation of the towing vehicle or the angular changing of its course are yieldingly resisted by the buffer springs 27.

This invention also eliminates the danger of the connection slipping on the rear axle since the towing head, owing to the initial compression of the springs 27, when the locking element is moved to locked position, always tightly engages the rear axle regardless of its relative angular position.

Having described my invention what I claim as new and desire to secure by Letters Patent, is:—

1. A towing device for vehicles comprising a tubular casing having a towing-head assembly mounted in each end thereof, each towing head assembly having a towing head and means for yieldingly transmitting compression forces from the towing head to the casing, a chain for connecting the towing head to an axle of the respective vehicle, and a locking element pivotally mounted near each end of the casing for holding the towing head and axle tightly together.

2. In a towing device, the combination of a casing, a towing head assembly mounted in one end of said casing, a locking element pivotally connected to said casing and assembly for holding the assembly from movement in said casing in one direction, said assembly including a towing head and spring means for yieldingly resisting movement of said towing head in the other direction.

3. A towing device for vehicles comprising a tubular casing having a tubular member telescopically mounted in one end thereof, releasable means for locking said member in adjusted position, towing head assemblies mounted respectively in said tubular casing and member, chains for connecting the axles of the vehicles to the respective towing head assemblies and locking elements for drawing said chains tightly about said axles.

4. A towing head assembly comprising a towing head, a rod connected thereto, a unit slidably mounted on the rod and consisting of washers and a bushing interposed therebetween, a spring bearing at one end against said unit and at the other end against said towing head, and removable means for retaining said unit on the rod, an apertured sleeve housing the rod and unit, a lug removably projected through said aperture and between said washers.

5. In a towing device for vehicles, the combination of a towing head having a rod connected thereto, a collar on said rod comprising spaced washers and a bushing for maintaining said washers in spaced relation, a coil spring embracing said rod and compressed between one of said washers and the towing head, a tubular casing, surrounding said rod and spring having apertures formed therein, a locking element having lugs extending through said apertures and between said washers and a chain attached to said locking element adapted to be tightened about a part of one of the vehicles by said locking element.

6. In a towing device, the combination of a casing provided with apertures, a locking element comprising two parts adapted to be secured together, said parts having inwardly extending lugs near one end adapted to be pivotally mounted in apertures formed in said casing, oppositely projecting trunnions on said parts and hook shaped members swivelled on said trunnions.

7. In a towing device, the combination of a casing provided with opposite apertures, a locking element pivotally mounted in said apertures, said locking element having oppositely projecting trunnions, hook shaped members swivelled on said trunnions adapted to engage the links of a fastening chain and a guard associated with one of said hooks for maintaining the links in operative engagement therewith.

8. In a towing device, the combination of a casing provided with opposite apertures, a locking element pivotally mounted in said apertures, said locking element being formed with a recess and having oppositely projecting trunnions and hook shaped members swivelled on said trunnions adapted to engage the links of a fastening chain, one of said hook shaped members being bifurcated, the free end of the chain beyond said bifurcated member being inserted through said recess.

9. In a towing device for vehicles, the combination of a casing, a tubular member slidably mounted in said casing, said casing being provided with an aperture and said member with a series of apertures adapted to register therewith, a yoke loosely embracing said casing having a pin secured thereto for engaging the registering apertures for adjusting the total length of the casing and member, and a spring interposed between said casing and yoke and opposite said pin for normally maintaining the pin in said registering apertures.

10. In a towing device for vehicles, the combination of a casing, a towing head yieldingly mounted in said casing, a chain adapted to embrace an axle of one of the vehicles, and a locking element pivotally mounted on the casing having hooked shaped members mounted thereon for engaging said chain, said element when moved to locked position placing tension on said chain and locating said hooked shaped members in such position that the pull on the chain tends to lock said element more securely.

11. In a towing device for vehicles, the combination of a tubular casing, an extension member adjustably mounted in one end of said casing, towing heads yieldingly mounted in the other end of said casing and in said extension member respectively, means for connecting a part of the towing and trailing vehicles to the corresponding towing head, and a releasible device for holding said member in adjusted position.

12. In a towing device for vehicles, the combination of a tubular casing provided with apertures, a locking element having inwardly extending lugs adapted to be pivotally mounted in said apertures, said lugs having flattened portions, a towing head mounted in the casing and spring means acting between said towing head and lugs adapted to exert pressure on said flattened portions for retaining the locking element in locked position.

13. In a towing device for vehicles, the combination of a towing head having a rod connected thereto, a collar on said rod comprising spaced washers and a bushing for maintaining said washers in spaced relation, spring means compressed between one of said washers and the towing head, a tubular casing having apertures formed therein, a locking element having lugs extending through said apertures and between said washers, said lugs having flattened portions adapted to be placed parallel to said washers when the locking element is in locked position whereby said spring means acts to retain said locking element in locked position.

14. A towing head assembly comprising a towing head, a rod connected thereto, a unit slidably mounted on the rod, a compression spring interposed between said towing head and unit, removable means for retaining said unit on the rod, a sleeve surrounding said rod and unit and a removable lug extending into said sleeve and forming an abutment for one end of said spring.

In testimony whereof I have hereunto set my hand in presence of two subscribing witnesses.

ERNEST HOLMES.

Witnesses:
S. BARTOW STRANG,
C. C. SHACKLEFORD.